BYPASS ARRANGEMENT FOR INCREASING CIRCUIT RELIABILITY

Filed Dec. 27, 1961

INVENTORS
MATTHEW LEVITT
ROBERT W. WHITNEY
BY Spencer E. Olson
ATTORNEY

United States Patent Office 3,168,707
Patented Feb. 2, 1965

3,168,707
BYPASS ARRANGEMENT FOR INCREASING CIRCUIT RELIABILITY

Matthew Levitt, Buffalo, and Robert W. Whitney, Orchard Park, N.Y., assignors to Sylvania Electric Products Inc., a corporation of Delaware Filed Dec. 27, 1961, Ser. No. 162,479
4 Claims. (Cl. 330—21)

Figure 1:
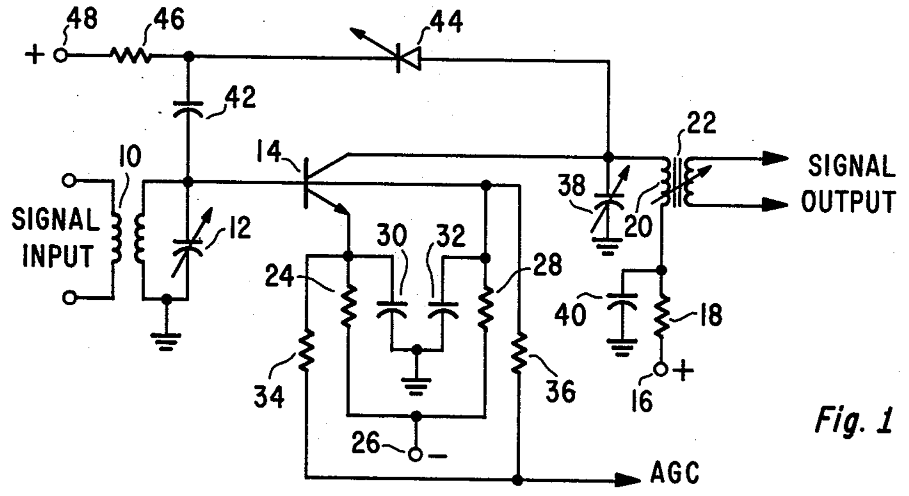

This invention relates generally to electronic circuitry and is more particularly concerned with arrangements for increasing the reliability of electronic circuitry.

In addition to placing a premium on size and weight, the environments to which present day electronic equipment is subjected impose the requirement of extreme reliability. Various types of redundancy have heretofore been employed to improve the reliability of electronic circuitry, the more usual method being to parallel two identical circuits or systems. For example, to provide a redundant intermediate frequency amplifier, two identical amplifiers or entire receivers have been paralleled, with switching circuits employed to connect the redundant or standby amplifier or receiver into operation upon failure of the normally operative one. This prior art method, which requires "two of everything," doubles the cost as well as the space requirements for the equipment, the latter being an essential consideration if the equipment is to be incorporated in a space vehicle, for example. Added to the cost of this type of redundancy is the cost of the circuits for switching the standby circuit into operation upon failure of the normally operative one. Moreover, the switching circuit itself must be extremely reliable, for if it should fail the benefit of having the standby circuitry will be lost. It is significant to note, also, that statistical analysis has shown the failure rate of electronic equipment to be the greatest during the first hours of operation, which leads to the conclusion that a failure of the redundant or standby circuit is more likely to occur than a second failure in the original operating circuit. In certain multi-stage circuits, such as the intermediate frequency amplifier of a receiver, a transistor failure results in a loss of voltage gain (in decibels) over twice the active gain of the stage and severe passband distortion. Thus, in such circuits, it may be more desirable to remove or bypass a faulty stage, allowing the remaining stages to function in their normal manner, for the likelihood of failure of another stage is less than the likelihood of failure in a complete standby immediate frequency amplifier, or in the switching circuitry needed to couple in the standby circuit.

With an appreciation of the shortcomings of known redundancy techniques, particularly in connection with multi-stage circuits, applicants have as a primary object of their invention to improve the reliability of multi-stage circuits.

Briefly, the invention contemplates the provision in a multi-stage circuit of means for bypassing the signal around a faulty stage upon failure of that stage, but which does not significantly interfere with the normal operation of the stage. The incorporation of the bypass circuitry does not alter the original voltage gain of the basic amplifier by more than one or two decibels per stage. The removal of a faulty stage through bypassing results in the loss of approximately only the active gain of that stage, while maintaining the original band pass characteristics of the multi-stage amplifier. In many circuit applications such a reduction in gain is not serious, and the circuit will continue to perform its intended function with only a slight degradation in effectiveness. It may be necessary in some cases to provide an extra stage of amplification in anticipation of the necessity of bypassing one of the stages, but obviously the cost of a single additional stage is much lower than the cost of a complete standby intermediate frequency amplifier. The invention has been satisfactorily operated in a transistorized multi-stage intermediate frequency amplifier, and will be described in detail in that application, but it will be apparent that the principles of this form of redundancy are applicable to other circuitry as well.

Figure 2:
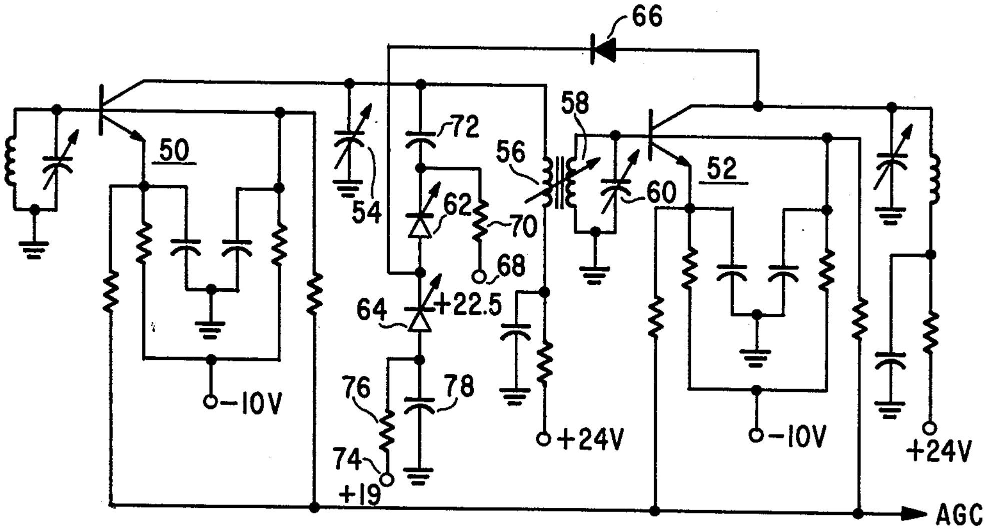

Other objects, features and advantages of the invention, and a better understanding of its organization and operation will be apparent from the following detailed description taken in conjunction with the accompanying drawings, in which:

FIG. 1 is a circuitry diagram showing one method of applying bypass redundancy to an amplifier stage; and FIG. 2 is a circuit diagram showing two stages of a multi-stage transistorized amplifier and illustrating another arrangement for bypassing a faulty stage.

The circuit diagram of FIG. 1 is typical of the input stage of an intermediate frequency amplifier, the present circuit, by way of example, having been designed for operation at 60 megacycles. The input signal is coupled to the stage through a transformer 10, the secondary of which is connected in parallel with variable capacitor 12 to constitute the input tank circuit. The input signal is applied to one of the terminals connected to the base region of a tetrode transistor 14, the collector of which is energized from a source of positive potential represented by terminal 16, which is connected to the collector through resistor 18 and the primary winding 20 of the output transformer 22. The emitter electrode of the transistor is connected through resistor 24 to a source of negative potential, represented by terminal 26. The other base electrode of the transistor is also connected to the source 26 of negative potential through resistor 28, resistors 24 and 28 being bypassed by capacitors 30 and 32, respectively. If desired, an automatic gain control signal may be applied to the stage from an AGC circuit located elsewhere in the system. As shown, the AGC voltage is coupled to the emitter and second base of the tetrode transistor via resistors 34 and 36, respectively. Primary winding 20 of the output transformer and capacitor 38 constitute the output tank, and bypass capacitor 40 is provided to isolate the source 16 from the output tank circuit.

To provide a basis for an understanding of the bypass circuit to be described, following are values of the components in a circuit which has been satisfactorily operated:

| | |
|---|---|
| Transistor **14** | 3N35 |
| Capacitors **12** and **38** ______micromicrofarads | 0.8–8.5 |
| Resistor **24** ______ohms | 5.1K |
| Resistor **28** ______do | 91K |
| Capacitors **30** and **32** ______micromicrofarads | 1,000 |
| Resistor **18** ______ohms | 3.6K |
| Potential source **16** ______volts | +24 |
| Potential source **26** ______do | −10 |

In accordance with the present invention, a feedthrough path from the base to the collector of transistor 14 is provided by capacitor 42 and a voltage-variable capacitor 44 connected in series, the junction between them being connected through a resistor 46 to a source of positive potential, represented by terminal 48. For the amplifier circuit values listed above, capacitor 42 has a value of 15 micromicrofarads, resistor 46 has a value of 47K ohms, and source 48 has a potential of 24 volts. As will be seen, this arrangement limits feedback from the collector to the base of the transistor when the amplifier is operating normally, but provides maximum feedthrough upon failure of the stage. In other words, the circuit represents a high impedance to 60 megacycles when the amplifier stage is operative, and a low impedance upon failure of the amplifier stage.

With the indicated circuit values, when transistor 14 is active the voltage-variable capacitor 44 is approximately 0.5 micromicrofarad, which in series with capacitor 42 presents a high impedance to 60 megacycles and therefore limits the feedback. However, upon failure of transistor 14, such as an open between the input base and the emitter, a short between the input base and the emitter (which offers a resistance of 100 to 150 ohms) or an open collector, the voltage at the collector of transistor 14 goes sufficiently positive to bias voltage-variable capacitor 44 to the point where it becomes a conducting diode to allow feedthrough from the input tank to the output tank. For this particular tetrode transistor, however, an open between the input base electrode and the emitter causes a decrease of about 20 micromicrofarads in its input capacity, sufficient to detune the input tank circuit, and for this reason this type of redundancy is not generally applicable to all of the stages of an intermediate frequency amplifier. It is satisfactory for the first stage disclosed in FIG. 1 for the reason that the input base circuit is a single-tuned wide band circuit which does not have appreciable shaping effects upon the response curve of the overall amplifier. Detuning of the input circuit tends to tilt the response curve only slightly. In a basic five stage intermediate frequency amplifier, the initial loss due to incorporation of the disclosed bypass circuit is approximately two decibels; bypassing of a failed input stage transistor by the disclosed technique results in an overall loss in voltage gain of approximately 25 decibels. If the stage were not bypassed, and the transistor 14 were to fail in one of the aforementioned respects, a voltage gain loss for the same five-stage amplifier would be over fifty decibels. Thus, it is seen that although bypassing of the first stage of the amplifier results in a reduction in gain of the overall amplifier, as would be expected, the reduction is not as great as it would be if the stage were left in. Indeed, the reduction in gain is such that the circuit can continue to operate with only a slight degradation in performance.

Since all stages of an intermediate frequency amplifier except the first are normally double-tuned, and consequently narrower band than the input stage, an arrangement different from that shown in FIG. 1 is required to bypass a later faulty stage. FIG. 2, showing two later stages of an intermediate frequency amplifier, illustrates an arrangement which provides feedthrough from the collector of the transistor of one stage to the collector of the transistor of the next stage to effectively bypass the latter stage should its transistor fail. The two illustrated amplifier stages 50 and 52 are substantially identical to the stage described in FIG. 1 with the exception that the interstage coupling is double-tuned. Specifically, stage 50 has a tunable output tank comprising a tuning capacitor 54 and inductance 56, and the input tank 58 of stage 52 is also tunable by variable capacitor 60. Otherwise, the stages are identical, corresponding circuit components and potential sources having the same values.

In FIG. 2, however, the feedthrough circuit is arranged to bypass the faulty transistor (in this case, the transistor in stage 52) as well as the tuned circuitry in its base circuit, thus eliminating the base detuning problem alluded to in the description of FIG. 1. The feedthrough circuit includes a pair of voltage-variable capacitors 62 and 64 connected in series, and a diode 66 connected from the junction of the two voltage variable capacitors to the collector of the transistor in stage 52. Voltage-variable capacitor 62 is biased by a source of positive potential, represented by terminal 68, to which it is connected through resistor 70. For the voltage and resistance values listed earlier, potential source 68 has a value of +22.5 volts and resistor 70 is 8.2K ohms. Capacitor 62 and its biasing circuit are D.C.-isolated from the collector of stage 50 by capacitor 72, which may have a value of 15 micromicrofarads. Similarly, voltage-variable capacitor 64 is biased from a source 74 having a value of +19 volts, through resistor 76 of 47K ohms. Capacitor 78 D.C.-isolates voltage-variable capacitor 64 from ground, allowing the junction of voltage-variable capacitors 62 and 64 to "float" as voltage conditions in the circuit may dictate.

The operation of the just-described feedthrough circuit is as follows: When stage 52 of the intermediate frequency amplifier is operating normally, the voltage at the collector of the transistor is +20 volts. Diode 66 is nonconducting with zero voltage across it. Voltage-variable capacitor 62 is back-biased with 2.5 volts so as to have a capacitance of approximately 0.7 micromicrofarad, whereas voltage-variable capacitor 64 has nearly zero voltage across it and has a capacitance of 5 micromicrofarads. Thus, the undesired 60 megacycle signal feed back from the collector of the transistor in stage 52 through the low shunt capacity (about 1.5 micromicrofarads) of diode 66 sees a low impedance path to ground through voltage-variable capacitor 64 and a high impedance path through voltage-variable capacitor 62 to the collector of the transistor in stage 50. Should the transistor in stage 52 fail, by an open between the input base electrode and the emitter, a short between the input base and the emitter, or an open collector, the collector voltage of the transistor rises to the +24 volt supply voltage. This causes conduction of diode 66 and the +24 volts potential to appear at the junction of voltage-variable capacitors 62 and 64. This causes voltage-variable capacitor 62 to conduct which, in turn, lowers the potential at the cathode of voltage-variable capacitor 64 and forward-biases diode 66. This voltage change back biases voltage-variable capacitor 64 causing its capacitance to change from 5 micromicrofarads to 1 micromicrofarad and to appear as a high impedance to ground for the 60 megacycle signal. Therefore, the signal is bypassed around the transistor of stage 52 by voltage-variable capacitor 62 and diode 66 and applied to the tuned collector circuit of the transistor.

The loss in overall voltage gain resulting from removal of the stage is approximately twenty decibels. The "seesaw" effect of the two voltage-variable capacitors tends to keep the collector of the transistor in stage 50 tuned, insuring an acceptable overall response curve. The degradation in voltage gain of twenty decibels was observed in the absence of AGC voltage. When AGC was applied, the loss of voltage gain due to a transistor failure was appreciably less. It follows that on strong signals there may be no degradation of voltage gain with a transistor failure in one stage. The initial loss resulting from the addition of the feedthrough circuitry to the basic intermediate frequency amplifier is approximately 1.5 decibels per stage. This is a relatively small price to pay, however, for the increase in reliability afforded by this type of redundance; the use of the circuit of FIG. 1 on the input stage and the circuit of FIG. 2 on the other four stages of a five-stage intermediate frequency amplifier increased its predicted mean time between failure from 55,400 hours to 919,000 hours.

Although the invention has been described in connection with an intermediate frequency amplifier employing tetrode transistors, it is to be understood that this is by way of example only, and that the invention is equally applicable to amplifier circuitry employing the more conventional three-electrode transistor. Likewise, the circuit values described above are intended as typical for a specific amplifier arrangement, and not in a limiting sense. Accordingly, it is the intention of applicants that the scope of their invention is limited only by the appended claims.

What is claimed is:

1. In combination with a multi-stage circuit of cascade-connected similar signal circuit stages each including an input circuit, an output circuit, signal processing means connected between said input and output circuits, and a first source of direct current potential connected to said output circuit, an alternating current by-pass circuit for at least one of said stages which comprises: a voltage-variable capacitor and another capacitor serially connected between a first point in the output circuit of the stage and a second point in said input circuit, and a second source of direct current potential connected to the junction of said capacitors, said second source being of a value to bias said voltage-variable capacitor relative to the potential at said first point during normal operation of the stage to have a capacitance of a value which offers a high impedance at the frequency of operation to thereby limit alternating current feedback from said first point to said second point through said bypass circuit, and to bias said voltage-variable capacitor relative to the potential at said first point upon a change in the latter potential attendant a failure in said signal processing means to cause it to function as a diode to thereby provide a low impedance signal path through said bypass circuit for coupling the signal around the faulty signal processing means of the stage.

2. In combination with a multi-stage circuit of cascade-connected similar signal circuit stages each including an input circuit, an output circuit, an active element connected to process alternating current signals from said input circuit to said output circuit, and a first source of direct current potential connected to said output circuit, an alternating current bypass circuit for each of said stages, each comprising: a diode, a voltage-variable capacitor and another capacitor serially connected in that order from a first point in said output circuit to a second point in said input circuit, and a second source of direct current potential connected to the junction of said capacitors, said second source being of a value to bias said voltage variable capacitor relative to the potential at said first point during normal operation of the respective stage to have a capacitance of a value which offers a high impedance at the frequency of operation to thereby limit alternating current feedback from said first point to said second point of said stage, and to bias said voltage-variable capacitor relative to the potential at said first point upon a change of the latter potential attendant a failure of the active element of the stage to cause said voltage-variable capacitor to function as a diode to thereby provide a low impedance alternating current signal path from said second point to said first point for coupling the signal around the faulty active element.

3. In combination with a multi-stage intermediate frequency amplifier including a plurality of cascade-coupled stages each including a transistor having at least base and collector electrodes, the first of said stages including a single tuned input circuit connected to the base of its transistor and a tuned output circuit connected to the collector of its transistor, and a first source of direct current potential connected to said output circuit, an alternating current bypass circuit for said first stage comprising: a voltage-variable capacitor and another capacitor serially connected from the collector of the transistor of said first stage to the base of the transistor of said first stage, and a second source of direct current potential connected to the junction of said capacitors, said second source of potential having a value relative to the potential at the collector of said transistor to bias said voltage-variable capacitor during normal operation of said first stage to have a capacitance of a value which offers a high impedance at the frequency of operation to thereby limit alternating current feedback from the collector to the base of said transistor, and of a value relative to said collector potential upon a change in the latter attendant a failure of said transistor to bias said voltage-variable capacitor to cause it to function as a diode to thereby provide a low impedance alternating current signal path from the base to the collector of said transistor for coupling the signal around the faulty transistor.

4. For improving the reliability of an intermediate frequency amplifier including a plurality of cascade-coupled stages each including as its active element a transistor having at least base and collector electrodes, a tuned input tank circuit connected between the base of the transistor and a point of reference potential, and a tuned output tank circuit connected between the collector of the transistor and a first source of direct current potential and inductively coupled to the tuned input tank circuit of the next succeeding stage, a circuit for by-passing the active element of a stage upon failure thereof which comprises: a diode, a first voltage-variable capacitor, and a first blocking capacitor serially connected in the order named between the collector of the transistor in one of said stages and the collector of the transistor in the immediately preceding stage, a second voltage-variable capacitor and a second blocking capacitor serially connected in the order named between the junction of said diode and first voltage-variable capacitor and said point of reference potential, a second source of direct current potential connected to the junction of said first voltage-variable capacitor and said first blocking capacitor for biasing said first variable capacitor relative to the collector voltage of the transistor of said one stage, and a third source of direct current potential connected to the junction of said second voltage-variable capacitor and said second blocking capacitor for biasing said second voltage-variable capacitor relative to the potential at the junction of said first and second voltage variable capacitors, said first, second and third sources of potential having values related to each other to bias said voltage-variable capacitors during normal operation of the transistor in said one stage to cause said first voltage-variable capacitor to have a value of capacitance which offers a high impedance at the frequency of operation and said second voltage-variable capacitor to have a value of capacitance which offers a low impedance at the frequency of operation and to render said diode non-conducting to thereby limit feedback from the collector of the transistor in said one stage to the collector of the transistor in said immediately preceding stage and to provide a low impedance path to said point of reference potential through said second voltage-variable capacitor and said second blocking capacitor, and to change the bias of said first and second voltage variable capacitors relative to the collector voltage of the transistor in said one stage attendant a failure of said last-mentioned transistor to cause said first voltage-variable capacitor to conduct and said second voltage-variable capacitor to have a value of capacitance which offers a high impedance at the frequency of operation, and to render said diode conducting, thereby to provide a low impedance path at the frequency of operation from the collector of the transistor in said preceding stage through said first blocking capacitor, said first voltage-variable capacitor and said diode to the collector of the transistor in said one stage for coupling the intermediate frequency signal around said one stage.

References Cited in the file of this patent

UNITED STATES PATENTS 2,356,296 Zinn ------------------ Aug. 22, 1944